Jan. 12, 1965 L. A. HANNULA ETAL 3,164,868
WALL MOUNTED TELEPHONE BOOTH
Filed Nov. 8, 1961 2 Sheets-Sheet 1

INVENTORS.
LESLIE A. HANNULA
MARTIN B. SCHAFFER
EDWARD S. ERTL
BY Parker & Carter
Attorneys.

WALL MOUNTED TELEPHONE BOOTH

Filed Nov. 8, 1961 2 Sheets-Sheet 2

INVENTORS.
LESLIE A. HANNULA
MARTIN B. SCHAFFER
EDWARD S. ERTL
BY Parker & Carter
Attorneys.

United States Patent Office 3,164,868

Patented Jan. 12, 1965

3,164,868
WALL MOUNTED TELEPHONE BOOTH

Leslie A. Hannula, Waukegan, Martin B. Schaffer, Park Forest, and Edward S. Ertl, Island Lake, Ill., assignors to Acoustics Development Corporation, Park Ridge, Ill., a corporation of Illinois Filed Nov. 8, 1961, Ser. No. 150,919
2 Claims. (Cl. 20—3.5)

This invention relates to acoustical telephone booths.

A primary purpose of the invention is a telephone booth of the type described in which the mounting for the telephone prevents tampering by vandals or the like.

Another purpose of the invention is a frame assembly suitable for mounting various size telephone booths.

Another purpose is a replaceable acoustical panel which may be used in telephone booths.

Another purpose is a combination mounting frame and acoustical telephone booth which are so arranged as to prevent tampering with the phone by vandals or the like.

Other purposes will appear in the ensuing specification, drawings and claims.

The invention is illustrated diagrammatically in the following drawings wherein.

Figure 1:
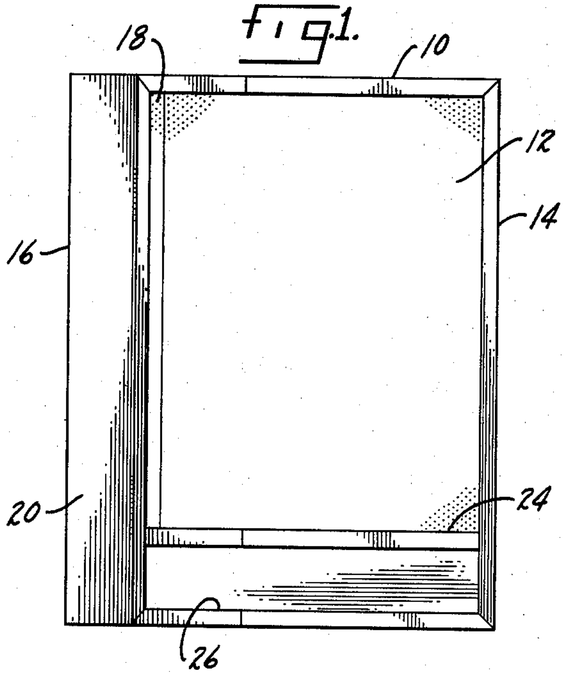
FIGURE 1 is a front view of the telephone booth of this invention.
Figure 2:
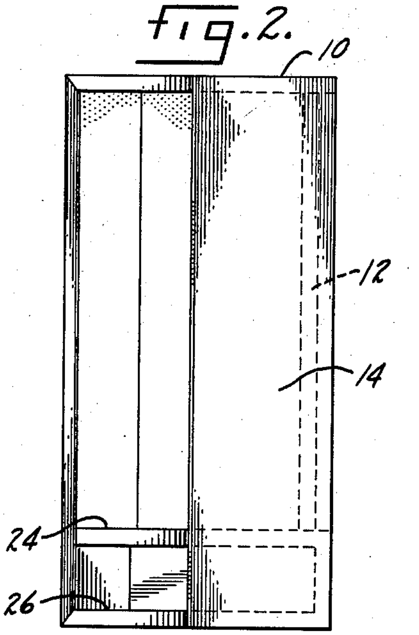
FIGURE 2 is a right-end view of the booth shown in FIGURE 1.
Figures 3, 4, 7:
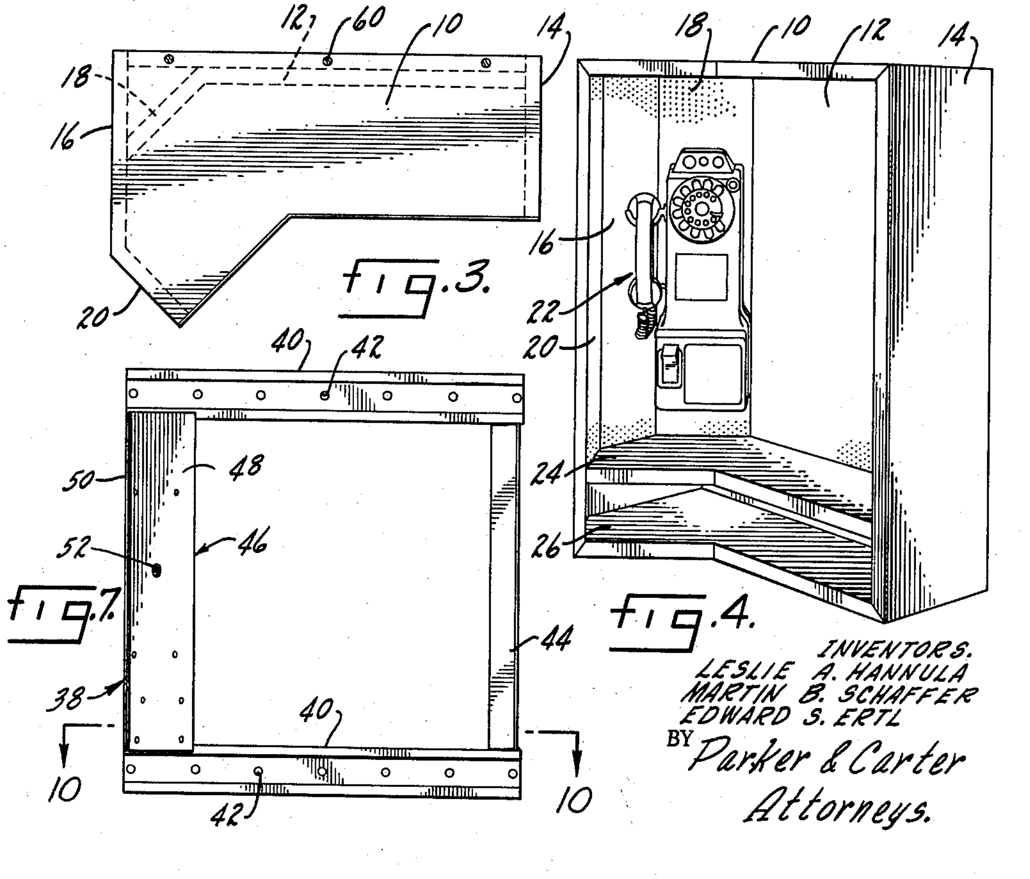
FIGURE 3 is a top plan view of the booth shown in FIGURES 1–2.
Figures 5, 8:
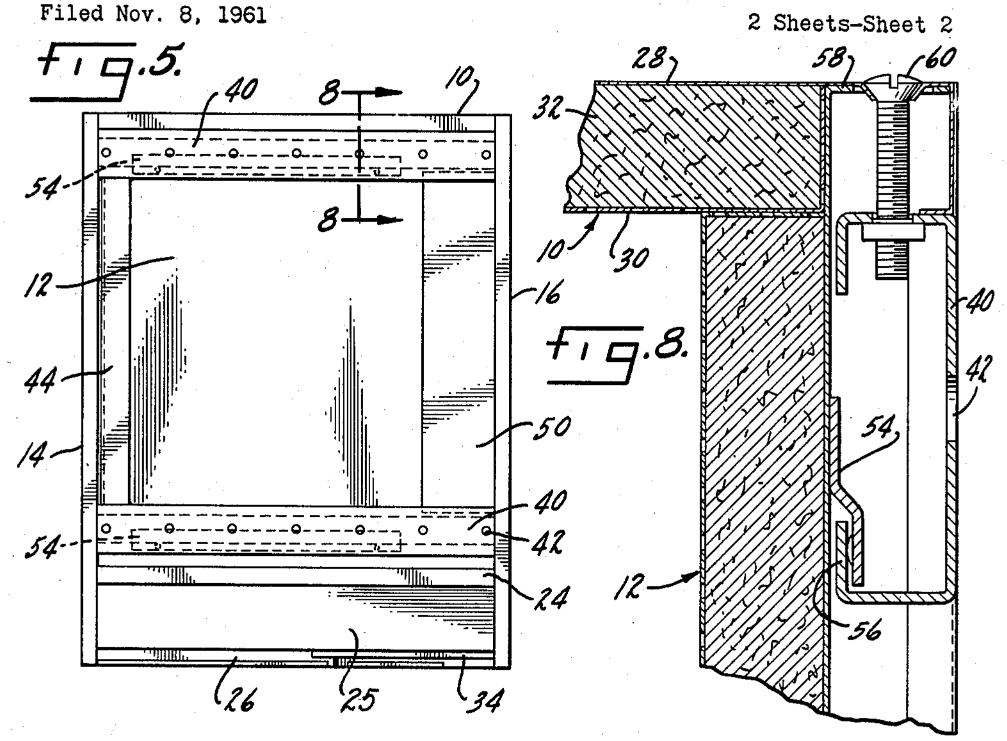
Figure 6:
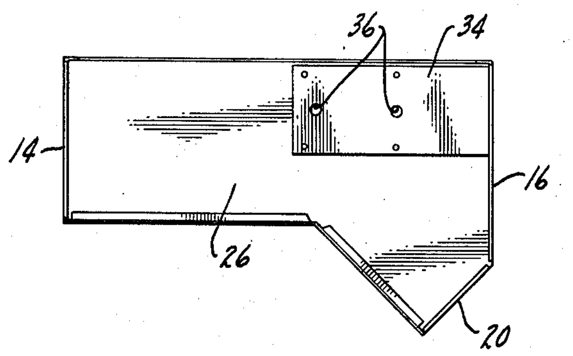
Figure 9:
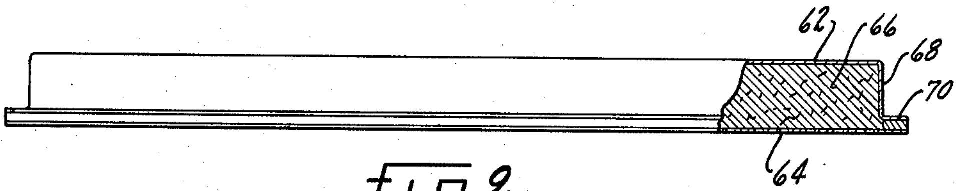
Figure 10:
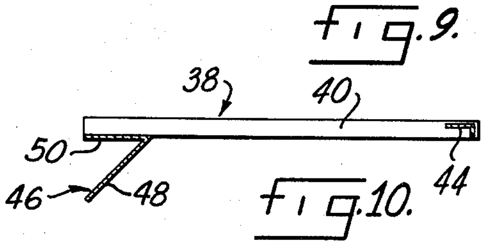

FIGURE 4 is a front perspective illustrating the booth with a telephone positioned therein, FIGURE 5 is a back view of the telephone booth and mounting frame, FIGURE 6 is a bottom view of the booth shown in FIGURES 1–5, FIGURE 7 is a front view of the mounting frame alone, FIGURE 8 is an enlarged section along plane 8—8 of FIGURE 5, FIGURE 9 is an end view, in part section, showing an acoustical panel for use in telephone booths, and FIGURE 10 is a section along plane 10—10 of FIGURE 7.

The telephone booth of this invention may include a top wall 10, a back wall 12, and a first side wall 14 and a second side wall 16 which are generally at right angles to the back wall 12. A generally upright diagonal side wall 18 connects the side wall 16 and the back wall 12. An inwardly directed side wall 20 and which may be considered a front wall may extend outwardly from the side wall 16 and is effective to define the enclosure for a suitable telephone indicated at 22. There may be a pair of spaced generally parallel bottom walls 24 and 26, with the upper bottom wall defining the enclosure for the telephone 22 and a writing surface. The lower wall 26 forms a shelf for use in storing telephone books or the like.

The top wall, side walls and back wall may each be of a suitable acoustic construction. FIGURE 8 illustrates the type of panel which may be used to form these walls. An outer metal plate 28, which preferably is imperforate, is spaced from and generally parallel to an inner perforated metal plate 30. The space 32 between the two plates may be filled with a suitable acoustical or sound-deadening material, for example a polyester urethane foam. Other types of acoustical material are also satisfactory.

The side walls 14 and 16, as well as the side wall 20, all extend down to the lower bottom wall 26. The diagonal wall 18 and a back wall 12 only extend down as far as the upper bottom wall 24. Both of the bottom walls 24 and 26 extend rearwardly beyond the back wall 12 and the diagonal wall 18. A plate 25 extends between side walls 14 and 16 and between bottom walls 24 and 26. The bottom walls 24 and 26 are not acoustical, although they may be, and preferably they are merely flat plates with the edges turned down. The side walls 14 and 16 extend rearwardly beyond the back wall 12 a distance sufficient to cover the sides of the mounting frame assembly, which will be described in detail hereinafter. The lower bottom wall 26 may have a plate or the like 34 adjacent the side wall 16 and underlying the slanted wall 18. The plate 34 is a subset mounting bracket and has suitable holes or the like 36 for the telephone service wires. In this way the wiring from the subset to the booth will be concealed.

A frame assembly indicated generally at 38 which provides a strong mounting for the telephone booth described, may include suitable horizontal channels 40, which are spaced one from the other and generally parallel. The channels 40 may have suitable mounting holes 42 which may be used to fasten the frame assembly to a wall or the like. A vertical connecting member 44 may be welded or otherwise connected to the channels 40 and may hold the channels in spaced relation. A vertical telephone support member 46 may have an angular mounting plate 48 which is positioned behind the slanted wall 18 and is used as a mounting for the telephone 22. The member 46 may have a second generally vertical plate 50 which is generally parallel to the channels 40 and member 44 and lies in the plane common to said channels, and is secured to the channels 40 at its opposite ends. Mounting plate 48 may have a suitable hole or the like 52 for a telephone service wire.

In addition to the booth and frame arrangement shown, some frames particularly for use in advertising or the like, may include a pair of spaced channels and a single mounting plate generally in the plane of the channels. The mounting plate may be placed at the center of the frame or any other point along the channels.

The back wall 12 of the booth has a pair of downwardly depending flange members 54 which extend into the open face of the channel members 40 when the telephone booth is hung on the frame. This construction is illustrated in FIGURE 8. Each flange member 54 extends down over a lower upwardly extending edge 56. The back wall 12 also has an upwardly overhanging flange 58 which extends over the top of the channel member at a height approximately equal to the upper portion of the top wall 10. Suitable screws or the like 60 may be used to hold the flange 58 and hence the booth to the upper channel member 40.

FIGURE 9 illustrates an acoustic panel which may be a replacement for the presently used glass panels in telephone booths. An outer metal plate 62, preferably imperforate, and an inner perforated metal plate 64 are spaced one from the other and generally parallel. The space between the plates may be filled with a suitable acoustic material 66. The outer plate 62 may have a bent-over portion 68 which extends around the periphery and cooperates with the inner plate 64 to form a peripheral flange 70. The flange 70 preferably has a width generally equal to the width of the presently used glass plates in telephone booths. In this way, the glass plate may be replaced by the panel shown in FIGURE 9 to soundproof the booth.

The use, operation and function of the invention are as follows:

A principal object of the present invention is to provide an acoustical telephone booth which is tamperproof and yet simple to install and put into service. One of the problems with present-day phone booths that are in relatively isolated areas during the evening hours, is that the phone may be easily ripped off its mounting by means of a suitable tampering tool, particularly a crowbar. Once the phone is ripped off, the money may be more readily removed. The present invention provides a tamperproof telephone booth in that the diagonal wall 18, which mounts the phone and which preferably has a width generally equal to the phone, is formed at an angle to the back wall 12 and the side wall 16 such that it is extremely difficult to use a conventional crowbar on the phone. The end of a crowbar is somewhat rounded and there must be sufficient space in order to get the end of a crowbar behind the telephone and to find a point for bracing another portion of the crowbar end. By using the angular relationship shown, it is extremely difficult for a standard crowbar to be used in removing the telephone from the booth shown. In addition, the telephone is actually mounted on the mounting plate 48 which is welded or otherwise suitably secured to the mounting frame for the booth. In this way, the telephone is actually mounted to a metal frame and to the wall, not just to the booth itself. Although tampering tools other than crowbars may be used on telephone booths, they require so much time in the removal of the phone that they are not ordinarily used. Accordingly, by preventing the removal of the phone booth through the use of a crowbar or the like, the booth is made practically tamperproof.

Another important advantage of the booth construction shown is that the spacing between the top of the booth and the top of the phone discourages the use of a crowbar. In like manner, the phone is close enough to the bottom of the telephone booth to prevent the insertion of a crowbar or other comparable tampering tool.

It is another important object of this invention to provide an acoustical telephone booth. Accordingly, the top and side and back walls of the booth are all made of a suitable acoustical panel. The panel includes an outer generally imperforate plate and inner perforated plate separated by a layer of a suitable acoustical material.

The frame for mounting the booth is important. The frame includes a pair of spaced channel members held together by a vertical connecting member and a vertical support member. With such a heavy construction, it is next to impossible to rip the phone booth from the wall. The frame also includes the mounting plate 48 which backs up diagonal wall 18 in mounting and securing the phone to the wall. The particular frame shown may be used to mount a variety of telephone booths as the length of the connecting member 44 may be varied. In addition, if it is desired to mount a larger booth, the frame structure may be the same size as shown, with the telephone booth extending down farther below the frame.

The telephone booth shown may be simply mounted on the frame by means of the flange members 54 which extend inside of the open face channel members and engage the upwardly extending ends 56. Screws or the like 60 may then be used to secure the top of the booth to the channel members.

An additional important feature of the invention is the acoustical panel illustrated in FIGURE 9. This panel may replace the conventional glass panels presently used in phone booths so as to make these booths soundproof. The width of the flange 70 is generally equal to the width of the glass panels so that a quick replacement may be made.

Whereas the preferred form of the invention has been shown and described herein, it should be realized that there are many modifications, substitutions and alterations thereto within the scope of the following claims.

We claim:

1. A tamperproof acoustical telephone booth comprising a rigid metal mounting frame adapted to be attached to a wall and a booth structure fixed to the frame, said frame including a pair of vertically spaced horizontally extending metal channels, a metal vertical connecting member fixed to both channels, a vertical metal telephone support member fixed to both channels and horizontally spaced from said connecting member, said support member being formed by a pair of plates, integral with each other along one edge, one of said plates lying in the plane common to said channels and being attached to said channels, the other plate forming an acute angle with said plane and opening in a direction away from said connecting member, said booth structure including an acoustical back wall, a pair of spaced generally downwardly depending flange members fixed to said back wall and in engagement with said channels, an acoustical first side wall at one end of the back wall and extending rearwardly beyond the back wall, an acoustical diagonal side wall at the other end of the back wall, said diagonal side wall lying flush against the plate forming an acute angle with the plane of the channels such that a telephone mounted on said diagonal side wall will be secured to said plate, a second acoustical side wall, parallel to said first side wall, joined to said diagonal side wall and extending rearwardly beyond said back wall, the angle of said diagonal side wall relative to said back wall and second side wall preventing removal of the telephone with a tampering tool, said first and second walls covering the frame, an inwardly directed acoustical side wall joined to said second side wall and extending partially across the front of the booth, an acoustical top wall joined to the top of said side walls and extending rearwardly beyond the back wall, and a bottom for said booth including a pair of spaced, generally parallel bottom walls extending rearwardly beyond said back wall, the upper of said bottom walls cooperating with the back, side, diagonal side, front and top walls and defining a space for the telephone, said diagonal side wall terminating at the upper of said bottom walls, the lower of said bottom walls cooperating with said side and front walls to define a shelf, said shelf extending rearwardly beneath said diagonal side wall.

2. The structure of claim 1 further characterized in that each of said acoustical side, top and back walls includes an outer imperforate metal plate and an inner perforated metal plate spaced therefrom, with a suitable acoustic material positioned in the space between said plates.

References Cited by the Examiner

UNITED STATES PATENTS

| | | | |
|---|---|---|---|
| 1,709,239 | 4/29 | Ver Weibe | 248—203 |
| 1,733,121 | 10/29 | Giddis | 20—3.5 |
| 2,282,394 | 5/42 | Corso. | |
| 2,427,012 | 9/47 | Lum | 20—3.5 X |
| 2,438,891 | 4/48 | Beardsley | 20—3.5 |
| 2,657,759 | 11/53 | Creamer | 181—33 |
| 2,671,522 | 3/54 | Bourgeois | 181—33 |
| 2,769,211 | 11/56 | Hewitt | 20—3.5 |
| 2,986,282 | 5/61 | Brink. | |

EARL J. WITMER, *Primary Examiner.*

JACOB I. NACKENOFF, WILLIAM I. MUSHAKE, *Examiners.*